US008862610B2

(12) United States Patent
Cheng et al.

(10) Patent No.: US 8,862,610 B2
(45) Date of Patent: Oct. 14, 2014

(54) METHOD AND SYSTEM FOR CONTENT SEARCH

(75) Inventors: Jerry Cheng, Mountain View, CA (US); Erik Jessen, Belmont, CA (US); Eric Hennings, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 146 days.

(21) Appl. No.: 13/446,679

(22) Filed: Apr. 13, 2012

(65) Prior Publication Data

US 2013/0275456 A1  Oct. 17, 2013

(51) Int. Cl.
*G06F 17/00* (2006.01)
(52) U.S. Cl.
USPC ............. 707/767; 707/758; 707/899; 706/12; 706/14
(58) Field of Classification Search
None
See application file for complete search history.

(56) References Cited

U.S. PATENT DOCUMENTS

| | | | |
|---|---|---|---|
| 7,100,123 B1 * | 8/2006 | Todd et al. .................... 715/862 |
| 7,308,439 B2 * | 12/2007 | Baird et al. ................... 707/758 |
| 7,797,301 B1 * | 9/2010 | Baird et al. .................... 707/706 |
| 7,966,352 B2 * | 6/2011 | Madan et al. ................. 707/821 |
| 8,099,436 B2 * | 1/2012 | Baird et al. .................... 707/791 |
| 2002/0188603 A1 * | 12/2002 | Baird et al. ........................ 707/3 |
| 2006/0271520 A1 * | 11/2006 | Ragan .............................. 707/3 |
| 2009/0132969 A1 * | 5/2009 | Mayer ........................... 715/862 |
| 2011/0047137 A1 * | 2/2011 | Baird et al. .................... 707/706 |
| 2011/0099464 A1 * | 4/2011 | Marashi et al. ............... 715/208 |
| 2012/0089587 A1 * | 4/2012 | Baird et al. .................... 707/706 |
| 2012/0221565 A1 * | 8/2012 | Bartomeli et al. ............ 707/728 |
| 2012/0260158 A1 * | 10/2012 | Steelberg ...................... 715/234 |
| 2012/0323704 A1 * | 12/2012 | Steelberg et al. .......... 705/14.73 |

* cited by examiner

*Primary Examiner* — Hung Le
(74) *Attorney, Agent, or Firm* — Pillsbury Winthrop Shaw Pittman LLP

(57) ABSTRACT

Method, system, and programs for content search are disclosed. A user interface configured based on context information is presented within a host application. A plurality of selectable search results are then fetched based on the context information and a query received from a user through the user interface. An input associated with a selection of one or more selectable search results is received from the user through the user interface. The user interface is updated based on the plurality of selectable search results. In response to the selection, the one or more selected search results are provided to the host application with the context information.

24 Claims, 14 Drawing Sheets

METHOD AND SYSTEM FOR CONTENT SEARCH

BACKGROUND

1. Technical Field

The present teaching relates to methods, systems, and programming for content search. Particularly, the present teaching is directed to methods, systems, and programming for content search on a user device.

2. Discussion of Technical Background

Online content search is a process of interactively searching for and retrieving requested information via a search application running on a local user device, such as a computer or a mobile device (handheld or portable device), e.g., a smart phone, tablet, music player, handled gaming console, global positioning system (GPS), from online databases. Content search is conducted through search engines, which are programs running at a remote server and searching documents for specified keywords and return a list of the documents where the keywords were found.

FIG. 1 illustrates a prior art standalone search application 102 on a user device 104, e.g., a mobile device, for browsing-based content search. A user 106 in this example interacts with an application 108 running on the user device 104 to complete certain tasks, such as writing and sending an email using an email client application or planning a trip using a travel agent application. The user 106 may from time to time need to search certain content for the ongoing tasks performed by the application 108. On the prior art user device 104, the user 106 has to leave the current running application 108 and visit the standalone search application 102 to perform the content search with a search engine 110. For example, referring now to FIG. 2, a user is editing a new TWITTER entry about Tom Cruise's new movie using a TWITTER client application on his smart phone and wants to refer to Tom Cruise's another movie. The user then needs to switch to a search application to do a search. As most of the known content search applications perform browsing-based search, i.e., each search result is associated with a webpage (e.g., by a hyperlink) such that clicking one search result will further navigate the user to the webpage through the hyperlink, as shown in FIG. 2, the user may go back and forth in order to find the desired result, i.e., the movie name "Eyes wide shut." The user then needs to manually bring the search results back to the application 108 from the standalone search application 102 in order to complete the tasks. For example, in FIG. 2, the user needs to perform "copy-and-paste" operations between the search application and the TWITTER client application. In other examples, the user 106 may need to memorize multiple search results and input them into the application one by one.

Apparently, the current mobile search experience is disjointed in the prior art as shown in FIGS. 1 and 2. Users suffer from at least three kinds of problems that greatly reduce the efficiency of the search. First, prior to search, on mobile devices, users more frequently want to search as a result of wanting to complete some tasks, which may begin in another application. As a result, the users need to leave the current application at hand in order to visit the search application. The context switch is costly and slow. Second, the search has no assumption/knowledge of what the user was doing prior to the search, and thus, the returned search results are frequently inaccurate or irrelevant. Users are in charge of correcting and disambiguating. This process is time consuming. Third, after search, users have to transport data back from the search application to the application that they started with. If there are multiple search results, this kind of round trip copy-and-paste behavior is costly.

Therefore, there is a need to provide an improved solution for content search on a user device to solve the above-mentioned problems.

SUMMARY

The present teaching relates to methods, systems, and programming for content search. Particularly, the present teaching is directed to methods, systems, and programming for content search on a user device.

In one example, a method, implemented on at least one machine each of which has at least one processor, storage, and a communication platform connected to a network for content search, is disclosed. A user interface configured based on context information is presented within a host application. A plurality of selectable search results are then fetched based on the context information and a query received from a user through the user interface. An input associated with a selection of one or more selectable search results is received from the user through the user interface. The user interface is updated based on the plurality of selectable search results. In response to the selection, the one or more selected search results are provided to the host application with the context information.

In another example, a method, implemented on at least one machine each of which has at least one processor, storage, and a communication platform connected to a network for content search, is disclosed. Context information including user attributes and/or content features is provided to an integrated search module. A user interface of the integrated search module configured based on the context information is then arranged. One or more search results are received with the context information from the integrated search module. The one or more search results are processed based on the context information. The processed one or more search results are eventually provided to a user. The one or more search results are selected from a plurality of selectable search results by the user through the user interface. The plurality of selectable search results are fetched by the integrated search module based on the context information and a query received from the user through the user interface.

In a different example, a system for content search is disclosed. The system comprises a host application and an integrated search module. The integrated search module comprises a user interface controller and a search result controller. The user interface controller is configured to present, within the host application, a user interface configured based on context information. The search result controller is configured to fetch a plurality of selectable search results based on the context information and a query received from a user through the user interface. The search result controller is also configured to receive an input associated with a selection of one or more selectable search results from the user through the user interface. The user interface is updated based on the plurality of selectable search results. The search result controller is further configured to, in response to the selection, provide the one or more selected search results to the host application with the context information.

In another example, an apparatus is disclosed. The apparatus comprises one or more processors, a memory, a communication platform, and one or more input/output devices. The one or more processors are configured to execute a host application and an integrated search module. The memory is configured to store the host application and the integrated search module. The integrated search module, when executed by the one or more processors, causes the apparatus to perform a series of steps. A user interface configured based on context information is presented within a host application. A plurality of selectable search results are then fetched based on the context information and a query received from a user through the user interface. An input associated with a selection of one or more selectable search results is received from the user through the user interface. The user interface is updated based on the plurality of selectable search results. In response to the selection, the one or more selected search results are provided to the host application with the context information. The host application, when executed by the one or more processors, causes the apparatus to perform a series of steps. The one or more selected search results are processed by the host application based on the context information. The processed one or more search results are presented to the user. The communication platform is configured to send the query and the context information to a search engine and receive the plurality of selectable search results from the search engine. The one or more input/output devices are configured to interact with the user through the user interface.

Other concepts relate to software for content search. A software product, in accord with this concept, includes at least one machine-readable non-transitory medium and information carried by the medium. The information carried by the medium may be executable program code data regarding parameters in association with a request or operational parameters, such as information related to a user, a request, or a social group, etc.

In one example, a machine readable and non-transitory medium having information recorded thereon for content search recorded thereon, wherein the information, when read by the machine, causes the machine to perform a series of steps. A user interface configured based on context information is presented within a host application. A plurality of selectable search results are then fetched based on the context information and a query received from a user through the user interface. An input associated with a selection of one or more selectable search results is received from the user through the user interface. The user interface is updated based on the plurality of selectable search results. In response to the selection, the one or more selected search results are provided to the host application with the context information.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of efficient and effective content search on a user device. The method and system as disclosed herein aim at improving the end-users' search experience and providing an end-to-end search solution to application developers. For end-users, the method and system allow host applications to provide contextual information that would improve the accuracy of the search. Upon the display of the results, users can interact and select one or more results, which the method and system then return the semantic data of the selected result for the host application to provide continuous and seamless processing to complete users' current tasks. The method and system provide a fast way for users to obtain a correct result by bringing search within the host application and reducing time spent on disambiguation. As to the developers of the host applications, the method and system as disclosed herein significantly reduce the implementation time of an integrated search function.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

Figure 1:
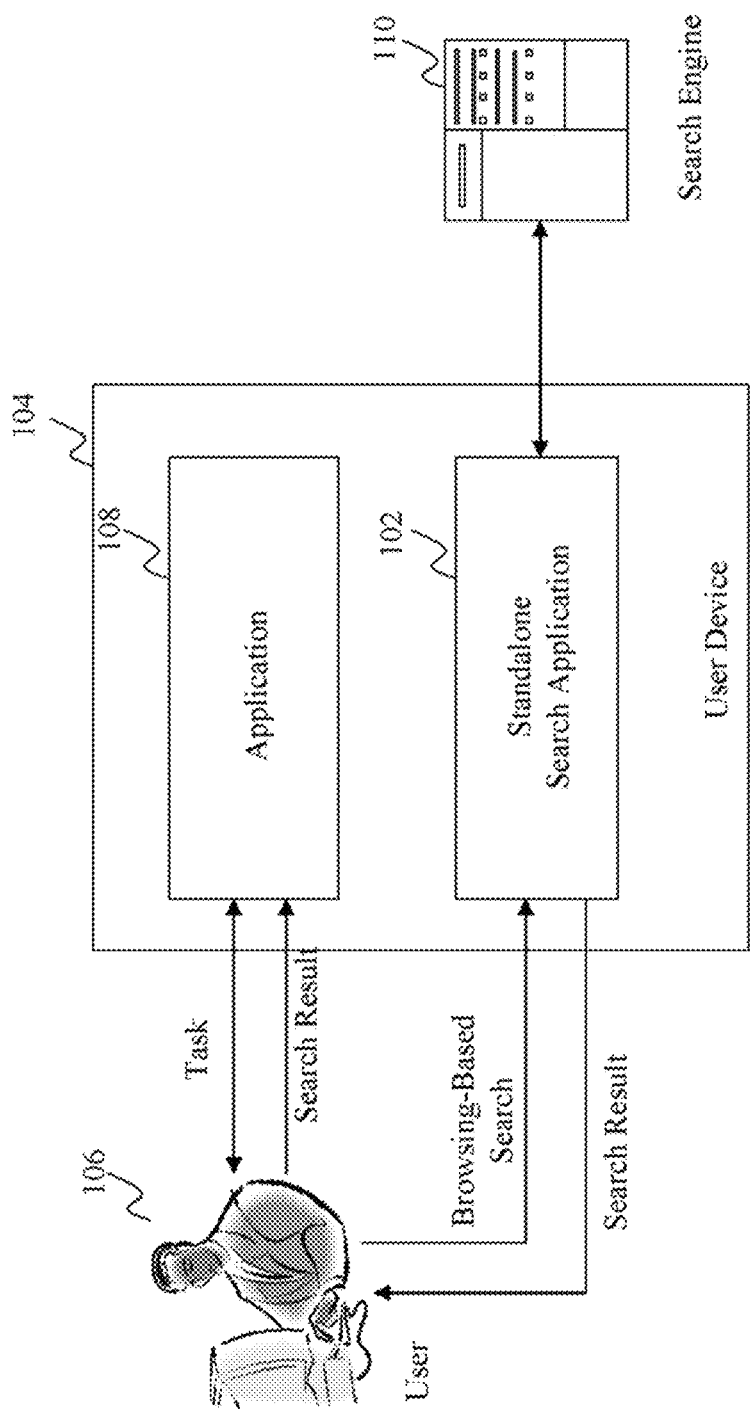
FIG. 1 depicts a prior art standalone search application on a user device for browsing-based content search.
Figure 2:
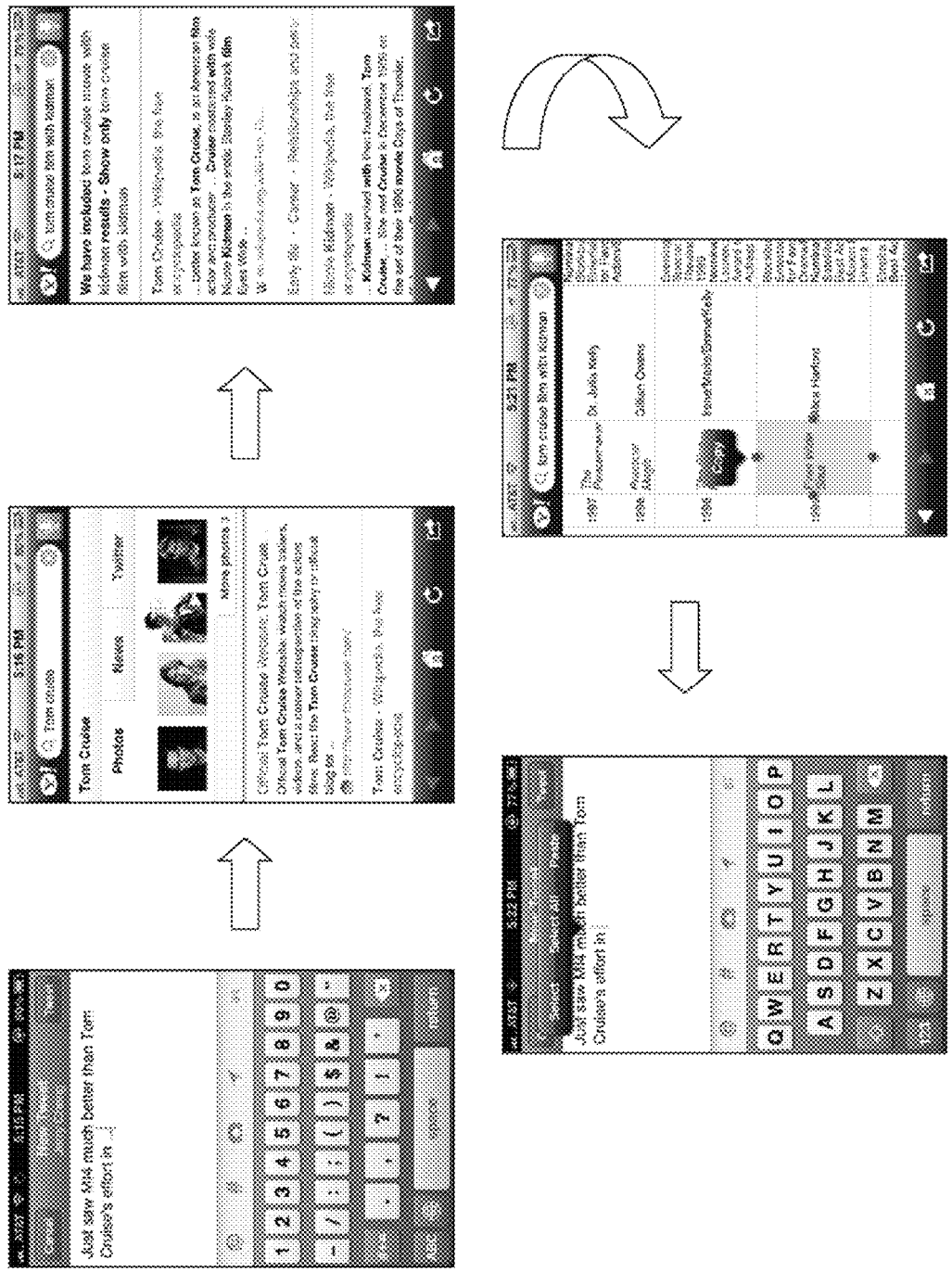
FIG. 2 illustrates a prior art process for browsing-based content search by a standalone search application on a user device.
Figure 3:
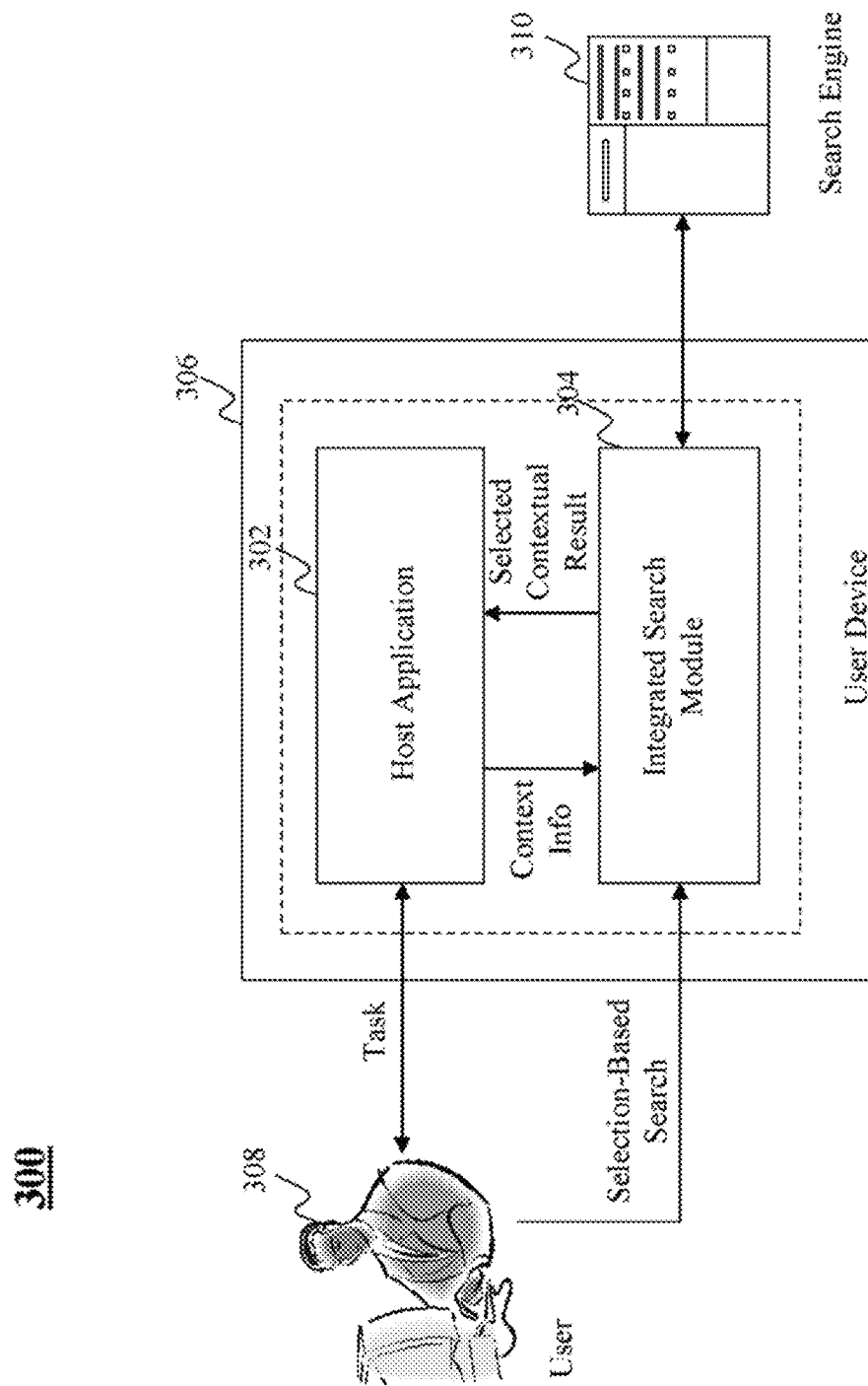
FIG. 3 is a high level exemplary system diagram of a system for selection-based content search on a user device, according to an embodiment of the present teaching.

FIG. 3 is a high level exemplary system diagram of a system for selection-based content search on a user device, according to an embodiment of the present teaching. The system 300 in this example includes a host application 302 and an integrated search module 304 that is embedded or integrated with the host application 302. The host application 302 and the integrated search module 304 may reside on a user device 306 to perform one or more tasks for a user 308. The user device 306 may be a laptop computer, desktop computer, netbook computer, media center, mobile device, gaming console, set-top box, printer, or any other suitable device. In this example, the user device 306 includes a mobile device (handheld device or portable device), such as but not limited to, a smart phone, a tablet, a music player, a handheld gaming console, and a GPS. The host application 302 may be any suitable applications pre-installed on the user device 306, such as a web browser, etc., or any third-part applications installed by the user 308 such as a social network client application, a travel agent application, etc. Although only one host application 302 is shown in FIG. 3, it is understood that in other examples, a single integrated search module 305 may serve multiple host applications if desired. The user 308 in this example interacts with the host application 302 to complete one or more tasks, for example, composing and sending emails through an email client application, planning trips through a travel agent application, and updating social network account through a social network client application.

The integrated search module 304 may be, for example, a software library in the form of compiled binary that can be integrated in the host application 302 by third-party developers of the host application 302 on various mobile operating systems, e.g., iOS, Android, Windows Phone, etc. The library may include application programming interfaces (APIs) allowing developers of the host application 302 to configure user interfaces, e.g., a search box, and other functionalities and features of the integrated search module 304, as descried in detail below. In this example, the integrated search module 304 may collect context information associated with the search from the host application 302, other components of the user device 306, and the user 308. The context information includes any information related to the user and/or the search content (search results) and that facilitates the search performed by the integrated search module 304 and the current user tasks performed by the host application. The context information may include user attributes such as but not limited to user's personal data, demographic data, interest, location, online activity history. The context information may also include content features such as category, topic, and timeliness of the desired search results. The context information may be entered by the user 308, retrieved and analyzed from user activity log files stored on the user device 306 or online, or fetched from the host application 302. In this example, the nature of the host application 302 (e.g., the type and characters of the host application 302) may be part of the context information. For example, a music layer application suggests that the categories of the desired search results include at least artists and music records. As noted above, in some examples, a single integrated search Module 304 may serve multiple host applications 302. In these examples, more context information may be collected from the multiple host applications 302 and combined across the multiple host applications 302 to serve even more relevant search results.

Search queries along with the associated context information are sent to one or more search engines 310, which return one or more selectable search results for the user 308 to perform a selection-based search. Each of the selectable search results may be an object with one or more attributes. For example, a selectable point of interest (POI) may contain multiple static attributes such as phone number, address, name, hours of operation, and dynamic attributes, such as weather. Different from the browsing-based search, at least one selectable search result is not associated with a webpage, i.e., does not contain a hyperlink, such that clicking on that search result would not cause further navigation of the search, but instead, would cause the search result being selected and returned to the host application 302. In this example, the user 308 performs a full selection-based search, i.e., all the returned search results are selectable and do not contain hyperlinks. It is understood that, in other examples, the user 308 may perform a partial selection-based search or a hybrid selection-browsing based search. That is, a selectable search result may optionally contain a destination hyperlink in addition to other attributes. This link is not necessarily activated as part of the user's search experience. Rather, it may be used by the host application 302 to enable post search contextual processing experience. In one example, some of the returned search results are selectable only while other search results contain hyperlinks. In another example, the user 308 may choose to either select/transfer a search result to the host application 302 if the result is clear and desirable, or further browse from the search result if necessary. In any event, the selected contextual result(s), i.e., the selected search result(s) with associated context information, e.g., semantic data, are provided directly by the integrated search module 304 to the host application 302 without user intervention. The host application 302 then may process the one or more selected search results based on the context information and present the processed search results to the user 308. In other words, the host application 302 completes the user's 308 current tasks based on the selected contextual result(s) in a continuous and seamless manner.

Figure 4:
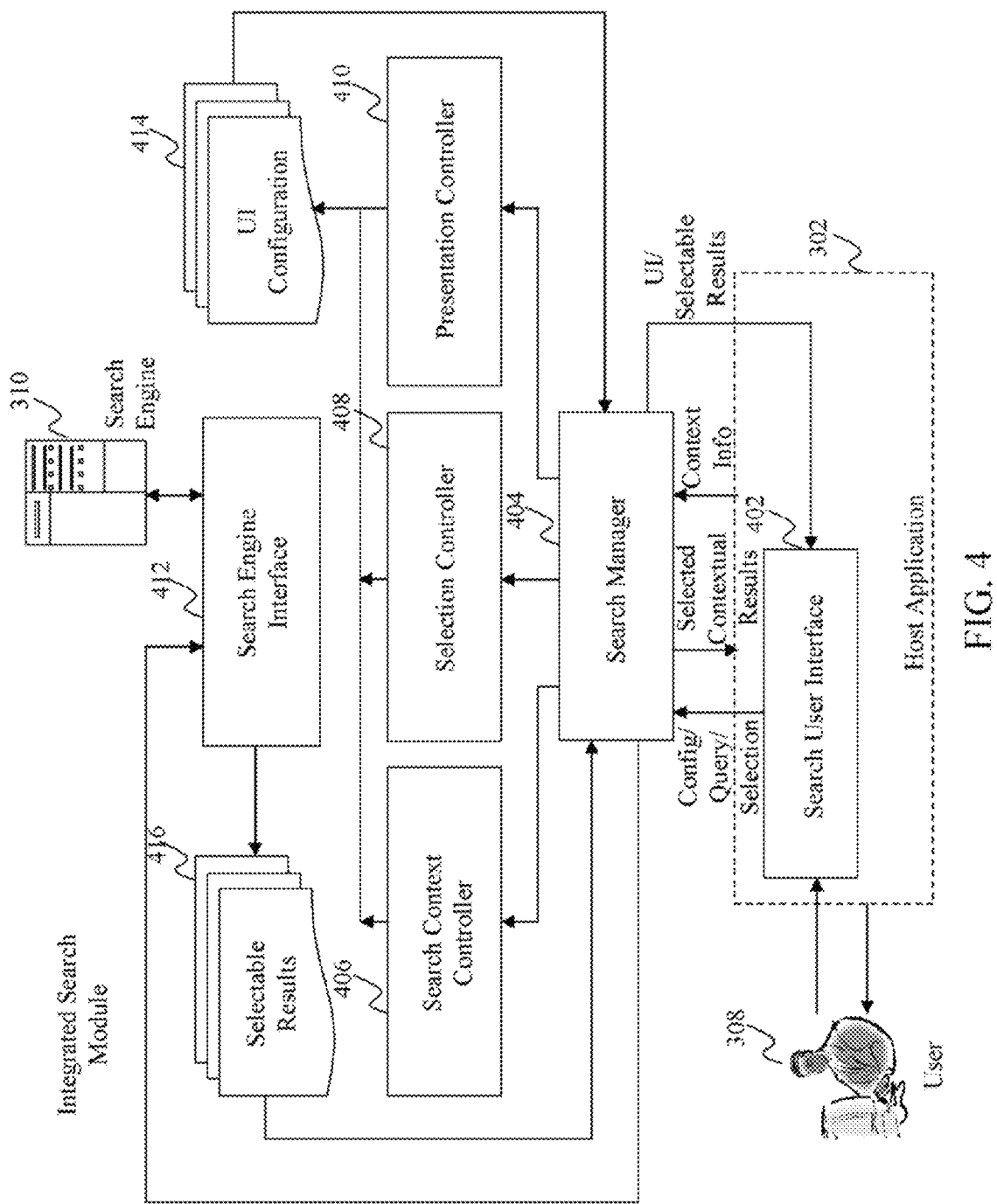
FIG. 4 is an exemplary diagram of an integrated search module of the system for selection-based content search shown in FIG. 3, according to an embodiment of the present teaching.
Figure 11:
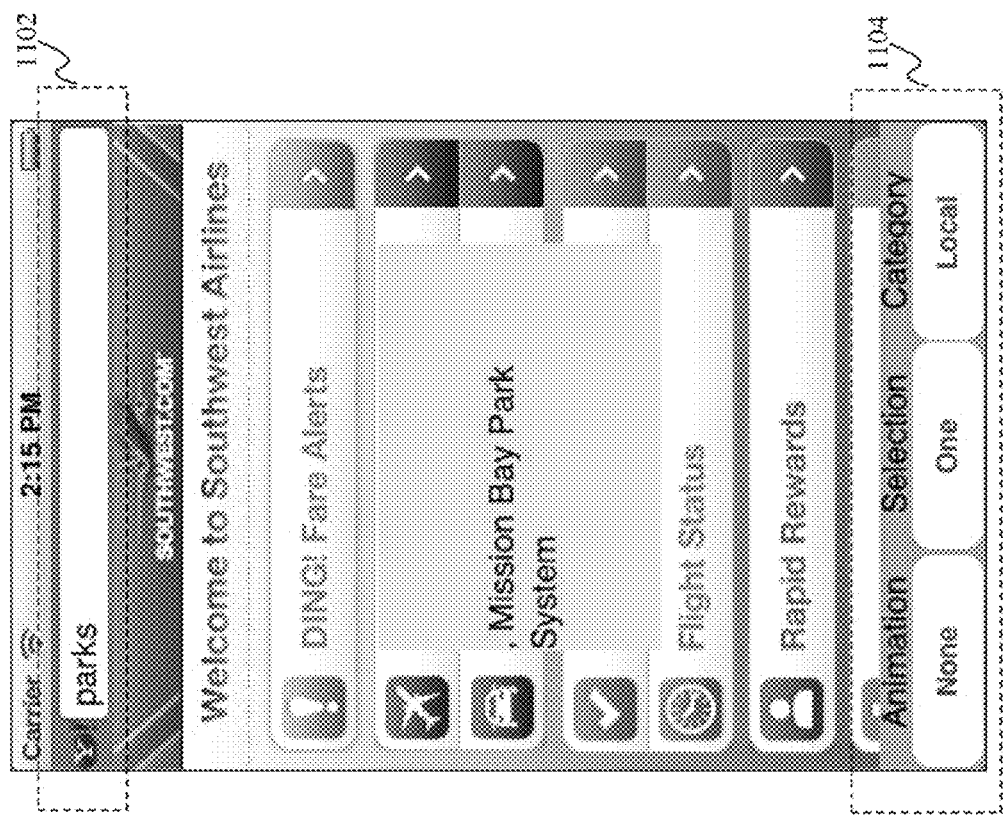
FIG. 11 depicts an exemplary user interface of the system for selection-based content search on a user device.
Figure 12:
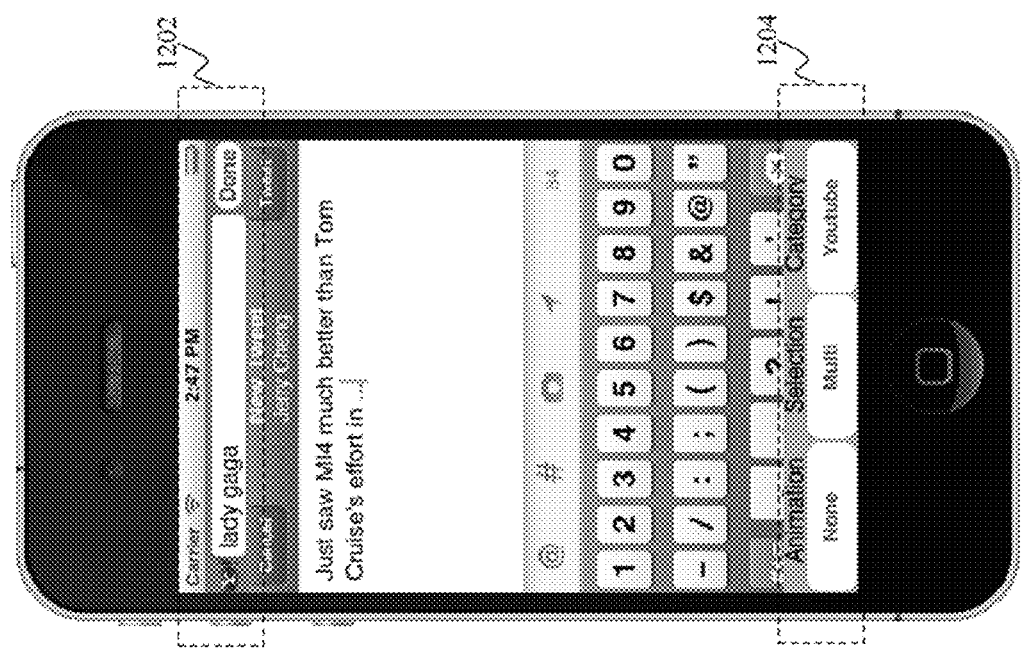
FIG. 12 depicts another exemplary user interface of the system for selection-based content search on a user device.
Figure 13:
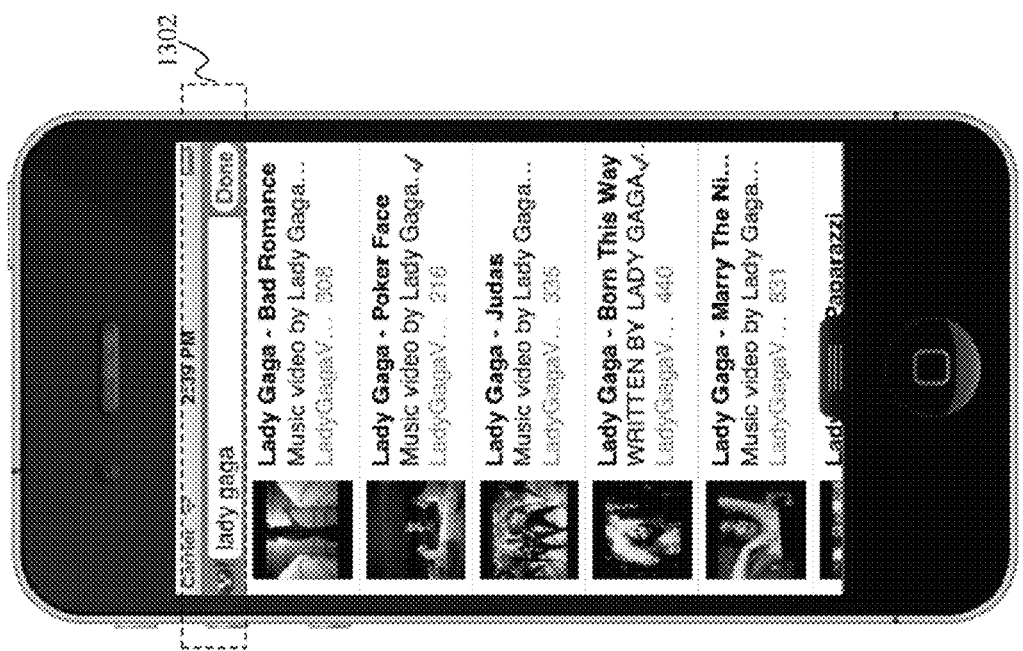
FIG. 13 depicts still another exemplary user interface of the system for selection-based content search on a user device.

FIG. 4 is an exemplary diagram of an integrated search module of the system for selection-based content search, according to an embodiment of the present teaching. In this example, the integrated search module 304 includes a search user interface 402, a search manager 404, various controllers including a search context controller 406, a selection controller 408, and a presentation controller 410, and a search engine interface 412. The integrated search module 304 may include an API for arranging user interface elements, such as a search box, at a location inside the host application 302. Referring now to FIGS. 11-13, screen shots of exemplary search user interfaces are presented in different host applications. For example, in FIG. 11, a search box 1102 is placed on top of a SOUTHWEST AIRLINE travel agent application; in FIG. 12, a search box 1202 is placed on top of a TWITTER client application; in FIG. 13, a search box 1302 is placed on top of a music player application. The search user interface 402 may include other user interface elements, for example, for presenting and receiving search configuration, as shown in FIG. 11 (1104) and FIG. 12 (1204). Various types of information may be received from the user 308 via the search user interface 402, including search configuration information, search query, user selection of search results. Various types of information may be presented to the user 308 via the search user interface 402 as well, for example, the selectable search results. In this example, the search user interface 402 is configured and generated by the search manager 404 in accordance with user interface configuration 414.

The search context controller 406 in this example is responsible for organizing all the context information collected by the search manager 404 into categories and converting them into part of the user interface configuration 414. The context information categories may include POI, movie, spelling, language translation, image, local information, and video, to name a few. Corresponding user interface configuration 414 may be determined based on the context information categories. Referring now to FIG. 11, in FIG. 11, the search user interface 1104 may present the search category as "local" based on at least the context information collected from the SOUTHWEST AIRLINE travel agent application. In FIG. 12, the search category is identified as "YOUTUBE." In some examples, various potential categories may be presented in a list to the user for selection if more than one search category has been identified based on context information. It is understood that, in some examples, the category may be organized in a mixed mode based on a hierarchy model. For example, for a music player host application, the context information, e.g., the type and characters of the host application, may derive sub-categories such as "artists" and "records" under the main category "music." In this case, the desired search results may be a combination of results from different sub-categories, such as one artist result plus two song results or two artist results plus one song result. Such determination may be made by the user through the search user interface 402 and may affect how the selected contextual results being generated and provided to the host application 302. In one example as shown in FIG. 13, a combination of one music video plus one lyric from Lady Gaga is selected by the user. The particular mixed mode based on the hierarchy model may be also part of the context information and provided to the host application 302 with the selected search results.

Referring back to FIG. 4, the selection controller 408 may be configured to determine the specific mode of the selection-based search. As described above, the search may be a full selection-based search, a partial selection-based search or a hybrid selection-browsing based search. Also, the allowable number of selected results in each selection may vary, e.g., from single selection ("select one") to multiple selection ("select multiple"). All the selection mode-related information may be applied by the selection controller 408 to generate part of the user interface configuration 414. For example, in FIG. 11, a single selection mode is determined by a user and/or the integrated search module 304, while in FIG. 12, a multiple selection mode is selected by a user and/or the integrated search module 342. The integrated search module 304 may for example, automatically recommend the suitable selection mode to the user based on the context information, such as the nature of the host application or the current user tasks. The presentation controller 410 in this example is responsible for determining the presentation level details as part of the user interface configuration 414, such as, the result display animation, color scheme, font, branding, theme, size, location, etc. The search engine interface 412 in this example is configured to interact with one or more remote search engines 310 to complete the search task for the integrated search module 304. For example, selectable results 416 may be provided by the search engine 310 to the search manager 404 via the search engine interface 412.

The search manager 404 in this example serves as a coordinator of the integrated search module 304 and as an interface between the host application 302 and the integrated search module 304, for example, for collecting context information from the host application 302 and providing selected contextual results to the host application 302. The details of the search manager 404 are described in FIG. 5.

Figure 5:
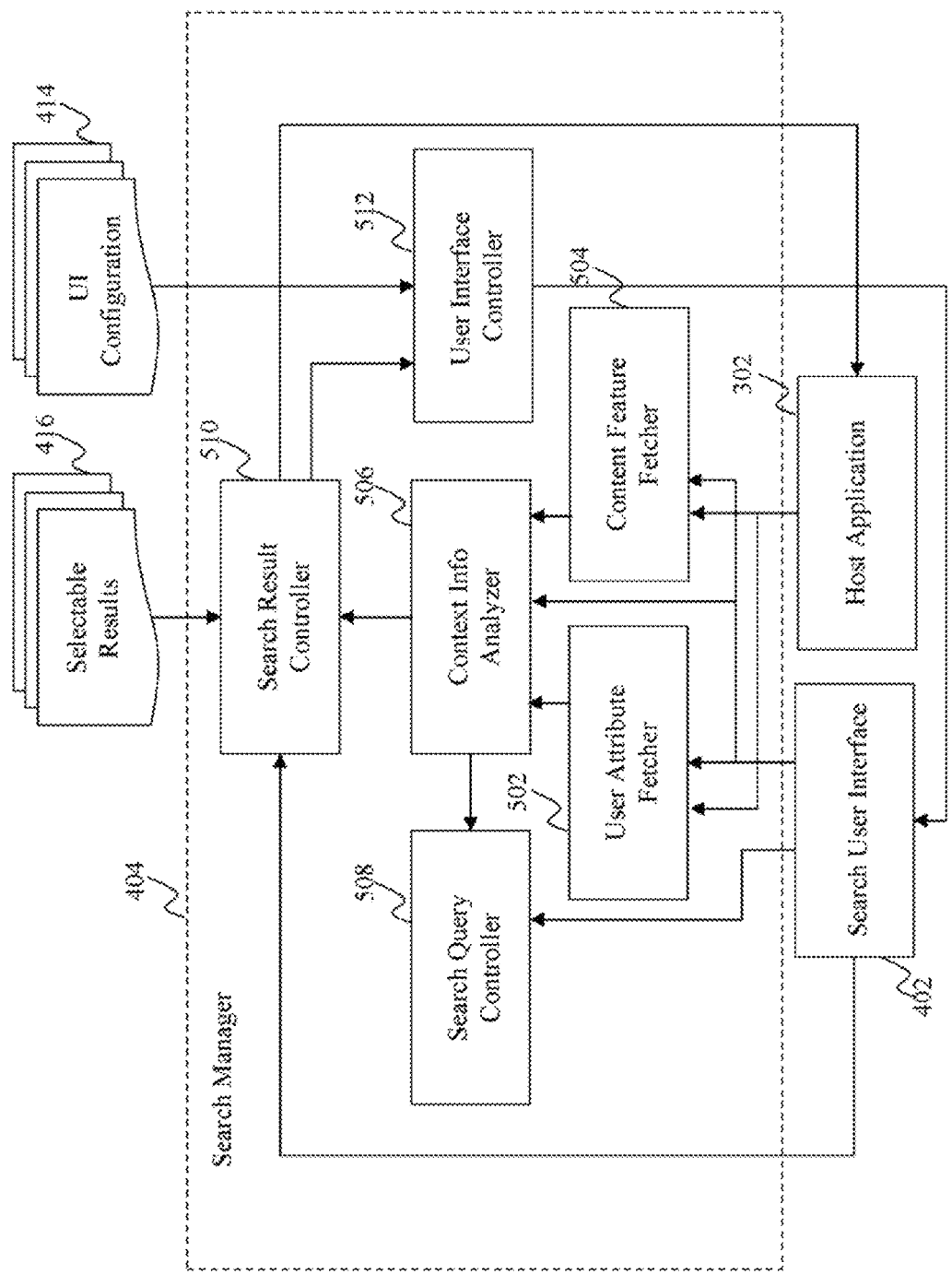
FIG. 5 is an exemplary diagram of a search manager of the integrated search module shown in FIG. 4, according to an embodiment of the present teaching.

FIG. 5 is an exemplary diagram of a search manager of the integrated search module, according to an embodiment of the present teaching. The search manager 404 in this example includes a user attribute fetcher 502, a content feature fetcher 504, a context information analyzer 506, a search query controller 508, a search result controller 510, and a user interface controller 512. The user attribute fetcher 502 and the content feature fetcher 504 are responsible for collecting context information from the host application 302 and the user 308 through the search user interface 402 as described above. Specifically, context information related to the user 308, i.e., user attributes, are interactively collected by the user attribute fetcher 502 from the user 308 or automatically collected from any local data source on the user device 306 or remote data source. Context information related to the content or search results, i.e., content attributes, such as category, topic, timeless of the search results, is interactively collected by the content feature fetcher 504 from the user 308 or automatically collected from any applications on the user device 306, including the host application 302. For example, the type or characters of the host application 302 may be related to the content feature, e.g., category or topic. All the collected context information is then fed into the context information analyzer 506 to further process the context information, e.g., by aggregating, expanding, or distilling the context information in order to get more relevant search results. For example, user profiles may be analyzed to infer user's long-term and short-term interests, which, when combined with the collected type or characters of the host application 302, may further determine the desired category or topic of the search results.

The search query controller 508 in this example is configured to extract search query from the user's input, e.g., typing in the search box, via the search user interface 402. The extracted search query, along with the associated context information, is fed into the search result controller 510 for generating a search request to the search engine 310. It is understood that the search query and its associated context information may be generated synchronously or asynchronously. In one example, the context information may be continuously collected and generated once the host application 302 is launched regardless of whether a search query is received. Once the search query is received, the most-recent context information is automatically associated with the search query in an asynchronous manner. In another example, the context information may be collected once the user starts to type in the search box or configure the search, e.g., select the selection mode or presentation details, in a synchronous manner. The search result controller 510 is also configured to forward the received selectable results 416 to the user interface controller 512. The user interface controller 512 is responsible for creating the search user interface 402 in accordance with the user interface configuration 414 and updating the search user interface 402 with the selectable results 416.

Figure 6:
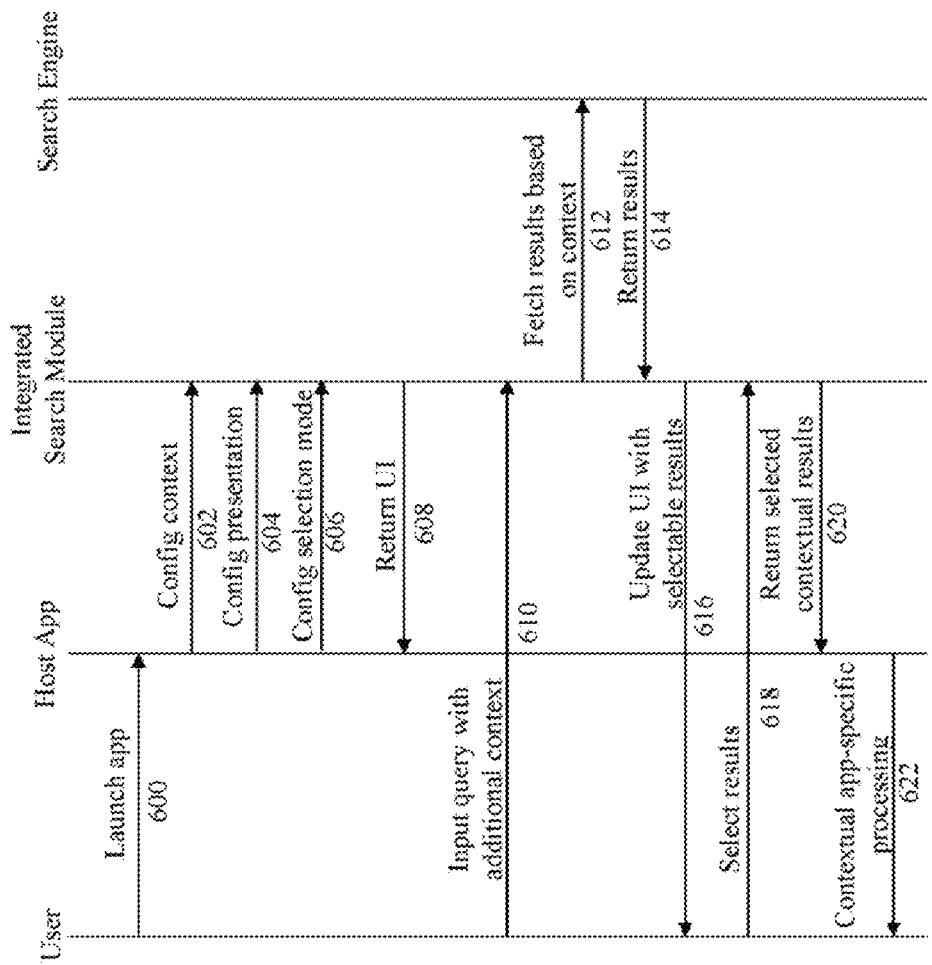
FIG. 6 depicts a time line chart for selection-based content search, according to an embodiment of the present teaching.

FIG. 6 depicts a time line chart for selection-based content search, according to an embodiment of the present teaching. At time 600, a user 308 launches the host application 302 on the user device 306, which in turn starts the integrated search module 304. At times 602, 604, 606, the host application 302 determines the user interface configuration 414 of the integrated search module 304 by configuring context information, presentation details, and selection mode, respectively. At time 608, the user interface configuration 414 is returned from the integrated search module 304 to the host application 302 to arrange the search user interface 402 within the host application 302. At time 610, the user 308 provides a search query through the search user interface 402 to the integrated search module 304. Optionally, addition context information may be provided by the user 308 at time 610 as well. The additional context information may be provided as supplements or updates to the context information previously collected by the host application 302. At time 612, the integrated search module 304 fetches search results from the search engine 310 based on the context information. At time 614, the search results are returned from the search engine 310 to the integrated search module 304. At time 616, the integrated search module 304 updates the search user interface 402 with selectable search results fetched from the search engine 310 for the user 308 to select. At time 618, the user 308 selects one or more desired search results, and the selection is fed into the integrated search module 304. At time 620, selected contextual search results are returned to the host application 302 by the integrated search module 304. At time 622, the host application 302 performs a contextual application-specific processing based on the returned contextual search results in order to complete the current tasks for the user 308.

Figure 7:
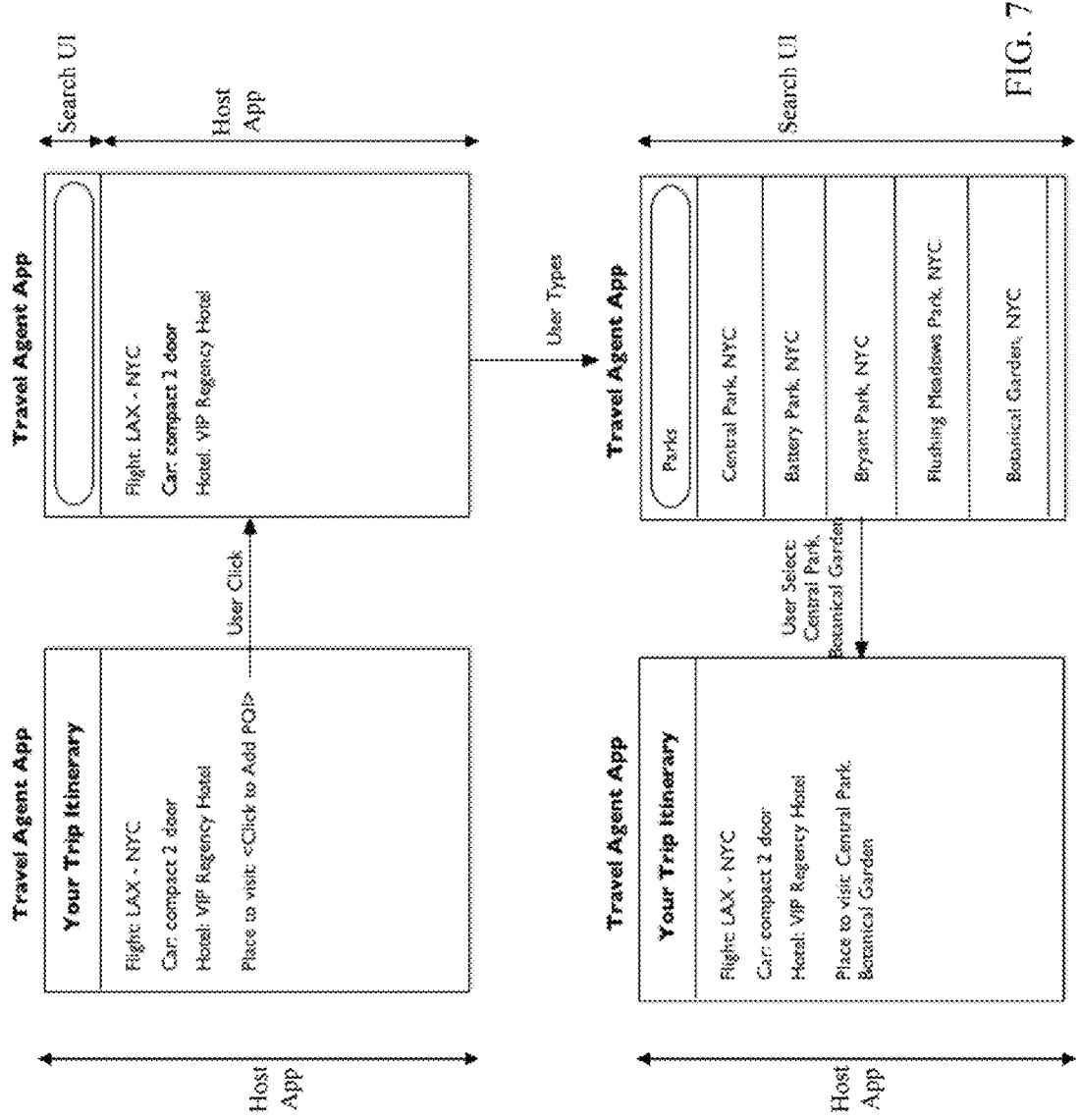
FIG. 7 illustrates an exemplary task performed by a travel agent host application with the integrated search module.

FIG. 7 illustrates an exemplary task performed by a travel agent host application with the integrated search module. Initially, a user starts the travel agent host application to plan a trip to NYC. One of the features of the travel agent host application is to plan "place to visit" by adding POIs. The user wants to visit parks in NYC but have no idea which parks to visit. By clicking on the "place to visit" feature of the travel agent host application, the integrated search module is invoked, and a search user interface is placed on top of the travel agent host application so that the user could search for parks to visit. Once the user types the search query "parks" into the search box, the integrated search module in conjunction with the travel agent host application collects context information associated with the search query "parks." For example, the category of the search results may be determined as "local information" based on where those search results to be used in the travel agent host application, i.e., "place to visit." Also, the location of the search results may be determined as "NYC" based on the trip destination identified in the travel agent host application. The multiple-selection mode may be further determined by analyzing other context information and/or by user selection. In any event, a plurality of most-relevant selectable search results about the local parks in NYC are returned to the integrated search module and presented via the search user interface. Although five results are shown in FIG. 7, it is understood that the actual number of results is not limited and may be scrollable if all of them cannot be displayed at the same time. The user in this example selects two of them—"central parks" and "botanical garden" by just clicking on the desired results in the list. The integrated search module then automatically, without any further user intervention, forwards the selected results with associated context information, e.g., category, location, selection mode, etc., to the travel agent host application. Based on the context information, the travel agent host application then automatically adds the selected parks to the "place to visit" to complete the user's travel planning task.

As discussed above, a partial selection-based search or a hybrid selection-browsing based search may be applied in the example shown in FIG. 7. For example, after a user selects a POI, e.g., a park name, for cautious space usage on a mobile device, only the name and address of the POI may be presented. When the user further clicks on the name, a hyperlink associated with the selected POI may be activated to enable the user to navigate to the associated webpage that contains further details of the POI. For some result type, this link may include even more timely updated details, such as weather or stock prices that are dynamic in nature.

Figure 8:
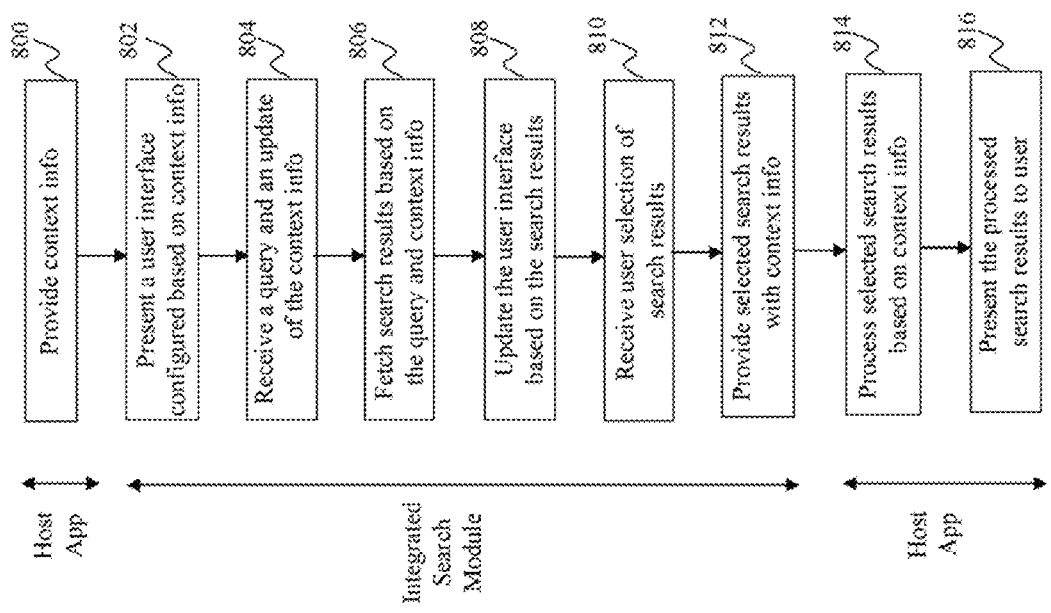
FIG. 8 is a flowchart of an exemplary process for selection-based content search, according to an embodiment of the present teaching.

FIG. 8 is a flowchart of an exemplary process in which selection-based content search is performed, according to an embodiment of the present teaching. It will be described with reference to the above figures. However, any suitable module or unit may be employed. Beginning at block 800, context information, including user attributes and/or content features, is provided, for example, by the host application 302 on the user device 306, to the integrated search module 304. The context information may be collected from the host application 302, other components of the use device 306, and a user. The context information helps to identify the most relevant search results for search query inputted by the user when the user is completing tasks using the host application 302. At block 802, processing may continue where a user interface configured based on the context information is presented within the host application 302, for example, by the integrated search module 304. For example, the user interface may include a search box placed at a location within the host application 302 where search is required. Presentation details of the user interface, such as result display animation, color scheme, position, may be defined based on the provided context information. At block 804, a search query is received, for example, by the integrated search module 304, from the user through the user interface. Optionally, an input associated with an update of the context information may be received from the user through the user interface as well. That is, the user may manually control, edit, or override the context information provided by the host application 302 at block 800. Proceeding to block 806, a plurality of selectable search results are fetched, for example, by the integrated search module 304, based on the provided context information and received query. This may be done for example, by a standard HTTP call to one or more remote search engines.

At block 808, processing may continue where the user interface within the host application 302 is updated based on the plurality of selectable search results, for example, by the integrated search module 304. All the selectable search results may be presented through the user interface for the user to select. At block 810, an input associated with a selection of one or more selectable search results is received from the user through the user interface, for example, by the integrated search module 304. Moving to block 812, in response to the selection, the one or more selected search results are provided for example, by the integrated search module 304 to the host application 302 with the context information. That is, the selected contextual search results are forwarded directly to the host application 302 without user intervention. At block 814, the one or more selected search results are processed by the host application 302 based on the context information. At block 814, the processed one or more search results are presented to the user within the host application 302. That is, the selected contextual search results facilitate the host application 302 to complete the current user tasks in a continuous and seamless manner. Although the processing in FIG. 8 is illustrated in a particular order, those having ordinary skill in the art will appreciate that the processing can be performed in different orders.

Figure 9:
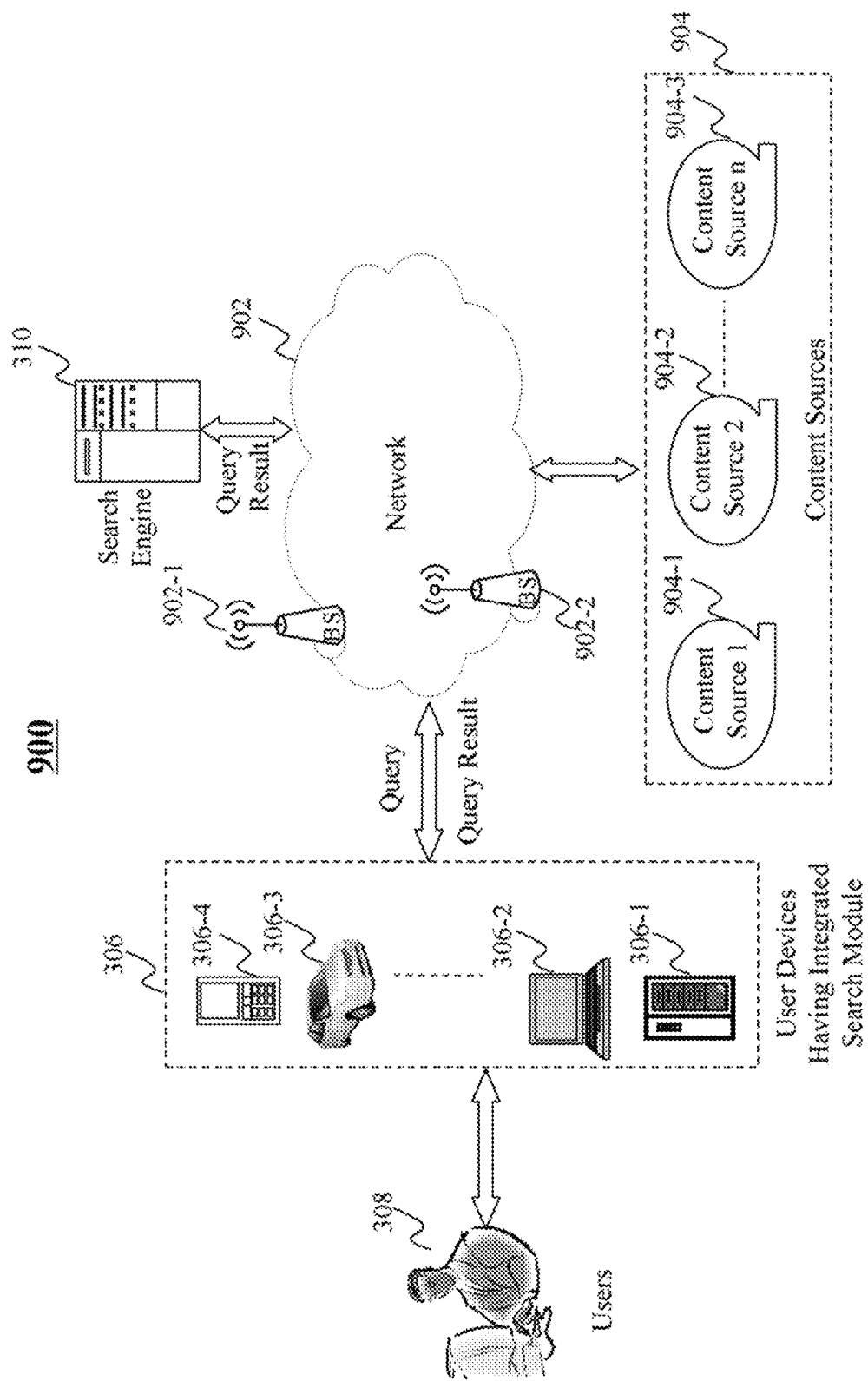
FIG. 9 depicts an exemplary embodiment of a networked environment in which content search is applied, according to an embodiment of the present teaching.

FIG. 9 depicts an exemplary embodiment of a networked environment in which content search is applied, according to an embodiment of the present teaching. In FIG. 9, the exemplary networked environment 900 includes a search engine 310, one or more users 308, user devices 306 having the integrated search module 304, a network 902, and content sources 904. The network 902 may be a single network or a combination of different networks. For example, the network 902 may be a local area network (LAN), a wide area network (WAN), a public network, a private network, a proprietary network, a Public Telephone Switched Network (PSTN), the Internet, a wireless network, a virtual network, or any combination thereof. The network 902 may also include various network access points, e.g., wired or wireless access points such as base stations or Internet exchange points 902-1, . . . , 902-2, through which a data source may connect to the network in order to transmit information via the network.

Users 308 may be of different types such as users connected to the network 902 via different user devices 306 having the integrated search module 304, including for example, desktop computers 306-1, laptop computers 306-2, a built-in device in a motor vehicle 306-3, or a mobile device 306-4. The user devices 306 may send a request associated with a search query and context information to the search engine 310 via the network 902 based on user's 308 inputs and receive query results from the search engine 310. The search engine 310 in this example may work as backend support to provide desired query results to the user devices 306. That is, the user devices 306 in this example may use the search engine 310 as a vendor to process a search query in the user request.

The content sources 904 include multiple content sources 904-1, 904-2, . . . , 904-3. A content source may correspond to a web site hosted by an entity, whether an individual, a business, or an organization such as USPTO.gov, a content provider such as cnn.com and Yahoo.com, a social network website such as Facebook.com, or a content feed source such as TWITTER or blogs. The search engine 310 and the user devices 306 may access information from any of the content sources 904-1, 904-2, . . . , 904-3. For example, the search engine 310 may fetch content, e.g., websites, through its web crawler to build a search index. The host applications 302 on the user devices 306 may obtain any additional information to provide context information for search or any necessary content for completing the current user tasks.

Figure 10:
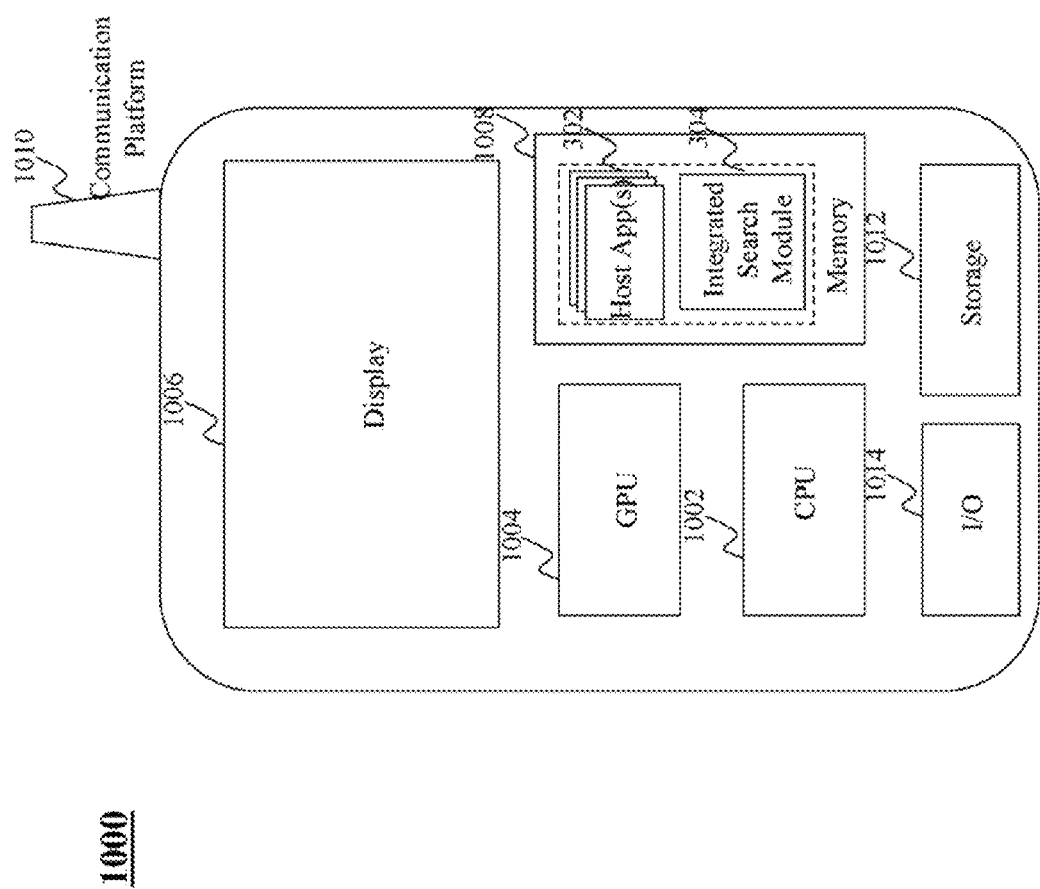
FIG. 10 depicts an exemplary functional block diagram of a user device on which the system for selection-based content search resides, according to an embodiment of the present teaching.

FIG. 10 depicts an exemplary functional block diagram of a user device on which the system for selection-based content search resides, according to an embodiment of the present teaching. In this example, the user device is a mobile device 1000, including but is not limited to, a smart phone, tablet, music player, handled gaming console, GPS. The mobile device 1000 in this example includes one or more central processing units (CPUs) 1002, one or more graphic processing units (GPUs) 1004, a display 1006, a memory 1008, a communication platform 1010, such as a wireless communication module, a storage 1012, and one or more input/output (I/O) devices 1014. Any other suitable component, such as but not limited to a system bus or a controller (not shown), may also be included in the mobile device 1000. As shown in FIG. 10, one or more host applications 302 and the integrated search module 304 may be loaded into the memory 1008 from the storage 1012 in order to be executed by the CPU 1002. The integrated search module 304 may be, for example, a software library in the form of compiled binary that is integrated in the host application 302 by third-party developers of the host application 302 on various mobile operating systems, e.g., iOS, Android, Windows Phone, etc. Execution of the host applications 302 with the integrated search module 304 may cause the mobile device 1000 to perform the processing as described above, e.g., in FIG. 8. For example, the user interface and the search results may be presented to the user by the GPU 1004 in conjunction with the display 1006. The search query and update of the context information may be received from the user through the I/O devices 1014. The search query, context information, and results may be communicated with remote search engines through the communication platform 1010.

To implement the present teaching, computer hardware platforms may be used as the hardware platform(s) for one or more of the elements described herein. The hardware elements, operating systems, and programming languages of such computers are conventional in nature, and it is presumed that those skilled in the art are adequately familiar therewith to adapt those technologies to implement the processing essentially as described herein. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 14:
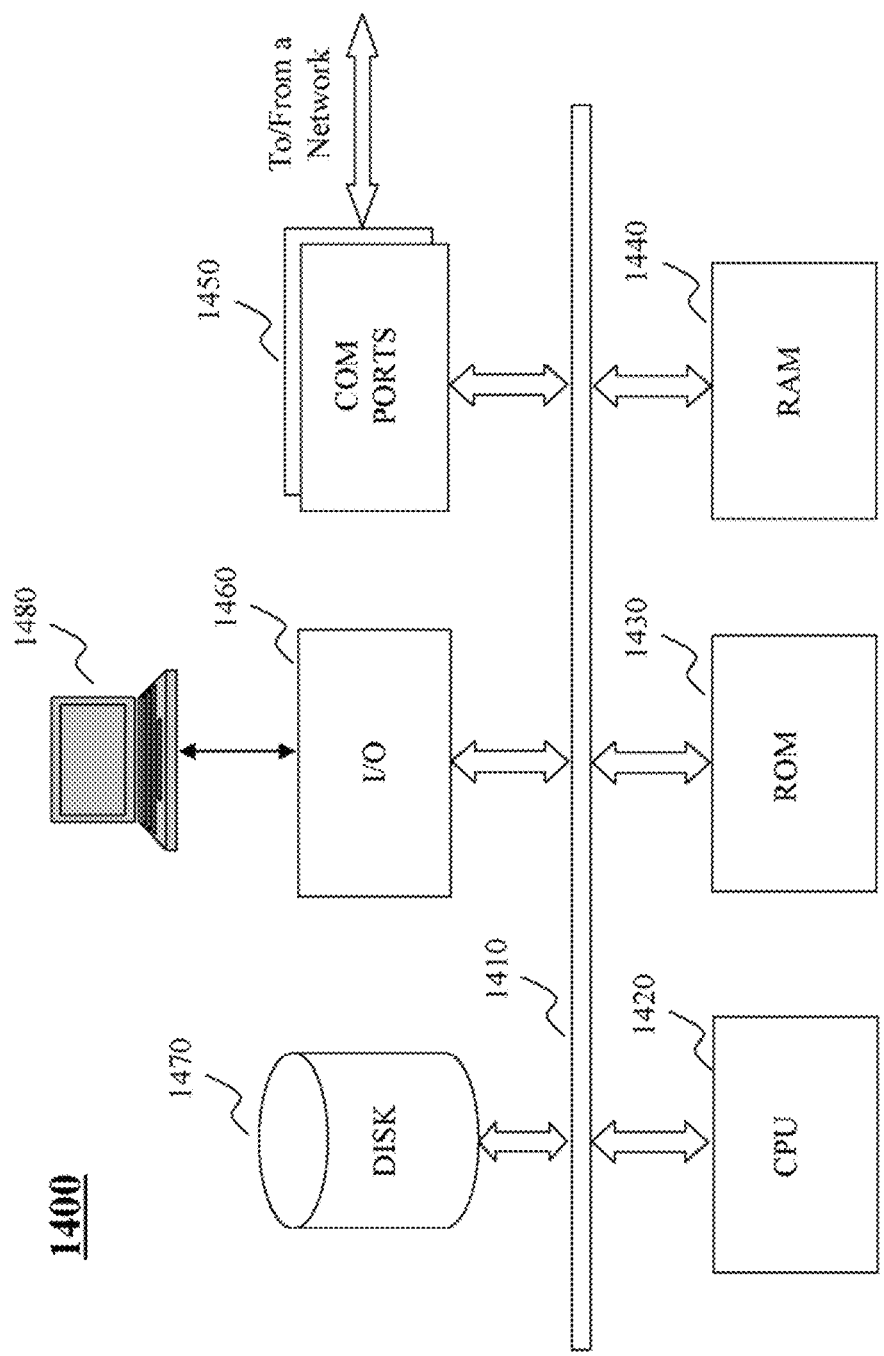
FIG. 14 depicts a general computer architecture on which the present teaching can be implemented.

FIG. 14 depicts a general computer architecture on which the present teaching can be implemented and has a functional block diagram illustration of a computer hardware platform that includes user interface elements. The computer may be a general-purpose computer or a special purpose computer. This computer 1400 can be used to implement any components of the content search architecture as described herein. Different components of the system, e.g., as depicted in FIGS. 3-5, can all be implemented on one or more computers such as computer 1400, via its hardware, software program, firmware, or a combination thereof. Although only one such computer is shown, for convenience, the computer functions relating to machine learning may be implemented in a distributed fashion on a number of similar platforms, to distribute the processing load browser The computer 1400, for example, includes COM ports 1402 connected to and from a network connected thereto to facilitate data communications. The computer 1400 also includes a central processing unit (CPU) 1404, in the form of one or more processors, for executing program instructions. The exemplary computer platform includes an internal communication bus 1406, program storage and data storage of different forms, e.g., disk 1408, read only memory (ROM) 1410, or random access memory (RAM) 1412, for various data files to be processed and/or communicated by the computer, as well as possibly program instructions to be executed by the CPU. The computer 1400 also includes an I/O component 1414, supporting input/output flows between the computer and other components therein such as user interface elements 1416. The computer 1400 may also receive programming and data via network communications.

Hence, aspects of the method of distributed machine learning, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium; punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the units of the host and the client nodes as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method, implemented on at least one machine each of which has at least one processor, storage, and a communication platform connected to a network for content search, the method comprising the steps of:
   presenting, within a host application, a user interface;
   receiving a query from a user through the user interface;
   determining a category of search based, at least in part, on the type of the host application;
   fetching a plurality of selectable search results based on the query received from the user through the user interface and the category of search;
   receiving an input associated with a selection of one or more selectable search results from the user through the user interface; and
   in response to the selection, providing the one or more selected search results with the context information to the host application.

2. The method of claim 1, further comprising obtaining context information associated with the host application.

3. The method of claim 2, further comprising:
   processing the one or more selected search results by the host application based on the context information; and
   presenting, within the host application, the processed one or more search results to the user.

4. The method of claim 2, wherein the one or more selected search results with the context information are directly provided to the host application without user intervention.

5. The method of claim 2, wherein the step of receiving a user input further comprises:
   receiving an input associated with an update of the context information from the user through the user interface.

6. The method of claim 1, further comprising:
   presenting a list of the plurality of selectable search results to the user through the user interface, wherein at least one selectable search result is not associated with a hyperlink.

7. The method of claim 6, wherein
   each of the plurality of selectable search results is associated with one or more attributes; and
   at least another selectable search result is associated with a hyperlink.

8. The method of claim 2, wherein
   the user interface is configured based on the context information; and
   the user interface is updated based on the fetched plurality of selectable search results.

9. A system for content search comprising a host application and an integrated search module, the integrated search module comprising:
   a user interface controller configured to:
     present, within the host application, a user interface, and
     receive a query from a user through the user interface;
   a search context controller configured to determine a category of search based, at least in part, on the type of the host application; and
   a search result controller configured to:
     fetch a plurality of selectable search results based on the query received from the user through the user interface and the category of search,
     receive an input associated with a selection of one or more selectable search results from the user through the user interface, and
     in response to the selection, provide the one or more selected search results with the context information to the host application.

10. The system of claim 9, wherein the search context controller is further configured to obtain context information associated with the host application.

11. The system of claim 10, wherein the host application is configured to:
    process the one or more selected search results by the host application based on the context information; and
    present, within the host application, the processed one or more search results to the user.

12. The system of claim 10, wherein the one or more selected search results with the context information are directly provided to the host application without user intervention.

13. The system of claim 10, wherein the integrated search module further comprising a context information analyzer configured to receive an input associated with an update of the context information from the user through the user interface.

14. The system of claim 9, wherein the search result controller is further configured to present a list of the plurality of selectable search results to the user through the user interface, wherein at least one selectable search result is not associated with a hyperlink.

15. The system of claim 14, wherein
each of the plurality of selectable search results is associated with one or more attributes; and
at least another selectable search result is associated with a hyperlink.

16. A machine-readable tangible and non-transitory medium having information recorded thereon for content search, wherein the information, when read by the machine, causes the machine to perform the following:
presenting, within a host application, a user interface;
receiving a query from a user through the user interface;
determining a category of search based, at least in part, on the type of the host application;
fetching a plurality of selectable search results based on the query received from the user through the user interface and the category of search;
receiving an input associated with a selection of one or more selectable search results from the user through the user interface; and
in response to the selection, providing the one or more selected search results with the context information to the host application.

17. The medium of claim 16, further comprising obtaining context information associated with the host application.

18. The medium of claim 17, further comprising:
processing the one or more selected search results by the host application based on the context information; and
presenting, within the host application, the processed one or more search results to the user.

19. The medium of claim 17, wherein the one or more selected search results with the context information are directly provided to the host application without user intervention.

20. The medium of claim 17, wherein the step of receiving a user input further comprises:
receiving an input associated with an update of the context information from the user through the user interface.

21. The medium of claim 16, further comprising:
presenting a list of the plurality of selectable search results to the user through the user interface, wherein at least one selectable search result is not associated with a hyperlink.

22. The medium of claim 21, wherein
each of the plurality of selectable search results is associated with one or more attributes; and
at least another selectable search result is associated with a hyperlink.

23. An apparatus comprising:
one or more processors configured to execute a host application and an integrated search module;
a memory configured to store the host application and the integrated search module, the integrated search module, when executed by the one or more processors, causes the apparatus to perform the following:
presenting, within the host application, a user interface,
receiving a query from a user through the user interface,
determining a category of search based, at least in part, on the type of the host application,
fetching a plurality of selectable search results based on the query received from the user through the user interface and the category of search,
receiving an input associated with a selection of one or more selectable search results from the user through the user interface, and
in response to the selection, providing the one or more selected search results with the context information to the host application, and
the host application, when executed by the one or more processors, causes the apparatus to perform the following:
processing the one or more selected search results by the host application based on the context information, and
presenting, within the host application, the processed one or more search results to the user;
a communication platform configured to send the query and the context information to a search engine and receive the plurality of selectable search results from the search engine; and
one or more input/output devices configured to interact with the user through the user interface.

24. The apparatus of claim 23, wherein the apparatus is a handheld device including at least one of a smart phone, a tablet, a music player, a handheld game console, and a global positioning system (GPS).

* * * * *